*INVENTORS*
HAROLD H. BURKE
BARTLETT WONG

BY Sughrue, Rothwell, Mion, Zinn & Macpeak

ATTORNEYS

United States Patent Office 3,463,423
Patented Aug. 26, 1969

3,463,423
ELECTROMECHANICAL FORCE FEEL SYSTEM FOR AIRCRAFT CONTROL STICK
Bartlett Wong, Boston, Mass., and Harold H. Burke, Bel Air, Md., assignors to Martin Marietta Corporation, New York, N.Y., a corporation of Maryland
Filed Feb. 16, 1968, Ser. No. 706,012
Int. Cl. B64c *13/46, 13/04*
U.S. Cl. 244—83   4 Claims

ABSTRACT OF THE DISCLOSURE

A force feel is electromechanically generated on an aircraft control stick by applying a voltage function proportional to desired force to a force follower loop. The force follower loop senses the applied voltage proportional to desired pilot force and develops via a servo valve and actuator, having a piston connected to the control stick the desired feel force. The force sensor is connected between the actuator housing and mechanical ground to prevent stick oscillations from developing undesired forces.

BACKGROUND OF THE INVENTION

A pilot controls an aircraft by deflecting the control stick. In high performance aircraft the control stick displacement is translated into hydraulic pressure which causes surface movement, e.g., elevator deflection, and thus the actual pilot force necessary to move the surfaces is negligible. In order to put a "force feel" on the control stick most designers connect bob weights, springs, dampers and other known elements to the linkage between the control stick and hydraulic system to create an "artificial force feel." For any given model aircraft the "artificial force feel" is known and is a major factor by which pilots can distinguish aircraft handling qualities. The feel force is primarily a function of the stick displacement and normal acceleration, the latter being artificially created primarily by the bob weights.

A more recent method disclosed in "A Functional Description and Working Data for the Variable-Stability System T-33 Airplane" by David Key, Cornell Aeronautical Laboratory Technical Report No. TC-1921-F-2, Air Force Contract No. AF33(615)-1253, October 1965, creates the artificial force feel by an electromechanical force follower loop into which the electrical equivalent of force versus acceleration and force versus stick deflection can be inserted. Aside from the anticipated advantage of reduced size, the electromechanical artificial force feel system offers the advantage of multiple force feel simulation. That is, for a single trainer aircraft, the force feel can be changed to simulate other aircraft by switching to a function generator which generates a different force versus deflection and force versus acceleration. The problem with the prior art attempt was that it proved difficult to design a stable electromechanical force balance loop for the control stick. The control stick itself is an elastic body and when the pilot puts force on the stick it tends to oscillate. The oscillations, once entered into the force balance loop cause stability problems. These problems were partly solved by use of relatively expensive notch filters which provided attenuation at the frequencies of expected stick oscillation. This design placed severe restrictions on the function generator to provide non-linear characteristics.

SUMMARY OF THE INVENTION

The present invention provides a stable force balance loop for a control stick in an electromechanical artificial force feel system without the use of notch filters. With an inherently stable force loop any nonlinear artificial feel force can be generated elctrically and inserted into the force balance loop. The stability is achieved by locating the force sensor in a position in which it is sensitive to the force applied to the control stick, but insensitive to the control stick elastic oscillations.

DETAILED DESCRIPTION OF THE INVENTION

Figure 1:
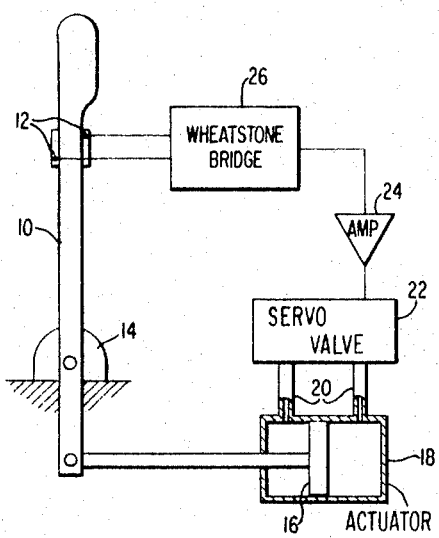
FIGURE 1 is a block diagram illustrating generally the force balance loop of a prior art electromechanical artificial force feel system.

In FIGURE 1 the control stick 10 pivots about a stationary member 14 in response to force exerted on the stick by the pilot. The force is sensed by strain gauges 12 which form branches of a Wheatstone bridge circuit 26. The output therefrom is a voltage proportional to the applied force and is amplified in amplifier 24 and applied to a servo valve 22 of known type which controls pressure on the piston 16 of actuator 18 by controlling the transfer of fluid via inlet/outlet 20. The system shown only provides force balance. An artificial force, such as a force versus deflection or force versus acceleration characteristic, can be inserted by generating a voltage proportional to the desired force characteristic and adding it into the feedback loop between the output of the Wheatstone bridge 26 and the input to the servo valve 22.

Since the stick 10 is an elastic body, it develops oscillations as a result of force applied thereto by the pilot. These oscillations potentially cause instability of the loop dependent upon control stick applied force and location of strain gauges 12. As stated above, one known method of reducing the stability problem due to elastic oscillations is to insert notch filters into the loop.

Figure 2:
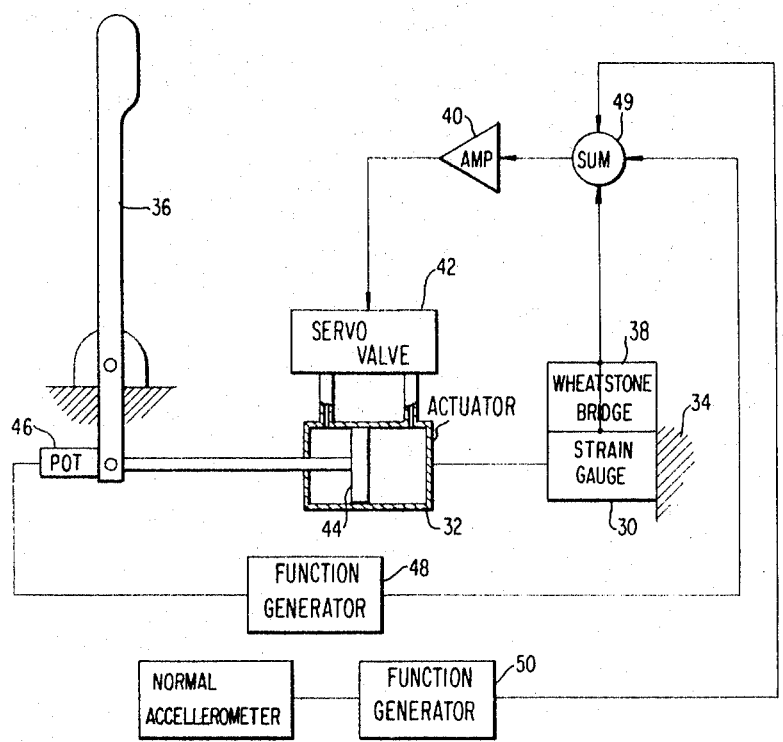
FIGURE 2 is a block diagram of a preferred embodiment of the present invention.

The present invention, shown in a preferred embodiment in FIGURE 2, removes stick oscillations as an instability factor by placing the strain gauge 30 between the actuator housing 32 and mechanical ground. Thus, when the pilot applies a force to the stick 36, the strain gauge senses the force but is insensitive to the stick oscillations. The remainder of the force balance loop is similar in that the Wheatstone bridge 38, which includes the strain gauge 30 applies a voltage proportional to force to an amplifier 40 whose output is applied to servo valve 42 to control the pressure on actuator 32 and consequently the force on stick 36.

The drawing also shows an example of how the artificially generated force is inserted into the force balance loop. A force function dependent upon stick deflection may be added by sensing stick deflection with a potentiometer 46, applying the voltage output of the potentiometer to a function generator 48 which generates any desired pattern of voltage versus deflection, and adding the output therefrom to the loop via a summation circuit 49. A force versus normal acceleration characteristic can be generated by applying a voltage proportional to normal acceleration to a function generator 50.

It should be noted that the particular output versus input characteristics of the function generators are not important to the present invention and that one of ordinary skill in the art can build a function generator providing a voltage output proportional to desired artificial feel force. Also, although a single balance loop is shown, it will be apparent to anyone of ordinary skill in the art that since the two coordinate axes of deflection of a control stick control two different aircraft surfaces, a duplicate force balance system would be provided along with suitable function generators for deflection and force along the other coordinate axis. Plural force feel simulation is achievable by switching function generators or by varying some of the elements in the same function generators.

While the invention has been particularly shown and described with reference to a preferred embodiment thereof, it will be understood by those skilled in the art that various changes in form and details may be made therein without departing from the spirit and scope of the invention.

What is claimed is:

1. A force balance system for an aircraft control stick artificial force feel system comprising:
    (a) force-to-electrical signal transducing means;
    (b) means responsive to an electrical signal from said transducing means for exerting a balancing force on the control stick, said means including a valve and an actuator having a housing and a movable piston connected to transfer force applied thereto to the control stick and servo means for controlling the pressure on said piston; and
    (c) said force-to-electrical signal transducing means being positioned between said actuator housing and mechanical ground to respond to pilot force applied to the control stick along an axis of deflection which controls an aircraft surface to convert the pilot force into a proportional electrical signal but to remain unresponsive to pilot force induced control stick oscillations.

2. The force balance system of claim 1 including further:
    (a) means for generating a voltage function proportional to the desired artificial feel force; and
    (b) means for combining said proportional voltage with said electrical signal and applying the output thereof to said servo means.

3. A force balance system as claimed in claim 1 wherein said transducing means comprises a strain gauge.

4. An artificial force feel system as claimed in claim 2 wherein said means for generating a voltage function comprises a first function generator responsive to stick deflection along said axis for generating a voltage which is a function of stick deflection and a second function generator responsive to the normal acceleration of the aircraft for generating a voltage which is a function of the normal acceleration.

References Cited

UNITED STATES PATENTS 2,991,028  7/1961  Sedgfield et al. _____ 244—76

FOREIGN PATENTS 800,958  9/1958  Great Britain.

ANDREW H. FARRELL, Primary Examiner